United States Patent
Jing

(10) Patent No.: US 8,963,527 B2
(45) Date of Patent: Feb. 24, 2015

(54) EMI MITIGATION OF POWER CONVERTERS BY MODULATION OF SWITCH CONTROL SIGNALS

(75) Inventor: Tao Jing, Fremont, CA (US)

(73) Assignee: Integrated Device Technology Inc., San Jose, CA (US)

( * ) Notice: Subject to any disclaimer, the term of this patent is extended or adjusted under 35 U.S.C. 154(b) by 499 days.

(21) Appl. No.: 12/983,288

(22) Filed: Dec. 31, 2010

(65) Prior Publication Data

US 2012/0170332 A1    Jul. 5, 2012

(51) Int. Cl.
*H02M 1/44*    (2007.01)

(52) U.S. Cl.
CPC .................................. *H02M 1/44* (2013.01)
USPC ........... 323/283; 327/118; 331/177 R; 363/39

(58) Field of Classification Search
USPC ............. 323/282, 283, 288; 363/39; 327/113, 327/134, 118; 331/177 R
See application file for complete search history.

(56) References Cited

U.S. PATENT DOCUMENTS

| | | | |
|---|---|---|---|
| 5,610,955 A | 3/1997 | Bland | |
| 6,784,625 B1 | 8/2004 | Andrews | |
| 7,701,305 B2 * | 4/2010 | Lin et al. | 331/143 |
| 7,961,059 B1 * | 6/2011 | Li | 331/78 |
| 2007/0132440 A1 * | 6/2007 | Yang | 323/304 |
| 2009/0102526 A1 * | 4/2009 | Yoneda | 327/158 |
| 2010/0039157 A1 * | 2/2010 | Kaeriyama et al. | 327/292 |
| 2010/0141233 A1 * | 6/2010 | Kwok | 323/351 |
| 2010/0253305 A1 * | 10/2010 | Melanson et al. | 323/282 |
| 2011/0298416 A1 * | 12/2011 | Singh et al. | 320/107 |

* cited by examiner

*Primary Examiner* — Fred E Finch, III
(74) *Attorney, Agent, or Firm* — Tracy Parris

(57) ABSTRACT

The present invention provides for EMI mitigation in switching circuitry, such as power converters, by implementing a controlled, non-random change in frequency in every cycle of switch control signals based on a static or dynamically changing modulation cycle. This permits frequency spreading across a wide range while avoiding excessive jitter between cycles and voltage dropouts common to randomized EMI control circuitry. Further, since it may be implemented digitally, some embodiments may avoid performance, size and power consumption problems experienced by mixed signal or analog switch control circuitry and EMI control circuitry. Further still, implementations of the present invention may mitigate EMI from a constant frequency source without the necessity of a variable frequency source, such as one generated by a VCO, to realize frequency variation. By eliminating the need for analog and mixed signal circuitry, and additional corrective circuitry, some embodiments may also reduce design, testing and production costs.

20 Claims, 6 Drawing Sheets

| n | $V_n$ | $V_{n_1}$ | $V_{n_2}$ to $V_{n_P}$ | Description |
|---|---|---|---|---|
| | | Variable Divider Control Provides $V_{n_1}$ to $V_{n_P}$ to Variable Divider to Divide fin P Times to Create Set of P Cycles of fout | | |
| 0 | $V_0$ | V+M-0 | V ... V | step 4 in 1st modulation cycle, 1st cycle of fout created from V+M-n cycles of fin |
| 1 | $V_1$ | V+M-1 | V ... V | step 4 in 1st mod. cycle, 2nd cycle of fout created from V cycles of fin |
| 2 | $V_2$ | V+M-2 | V ... V | |
| 3 | $V_3$ | V+M-3 | V ... V | |
| 4 | $V_4$ | V+M-n | V ... V | step 4 in 1st mod. cycle, $P^{th}$ cycle of fout created from V cycles of fin |
| ... | | | | |
| 2M-2 | $V_{2M-2}$ | V+M-n | V ... V | |
| 2M-1 | $V_{2M-1}$ | V+M-n | V ... V | |
| 2M | $V_{2M}$ | V-3M+n | V ... V | step 2M+2 in 1st mod. cycle, 1st cycle of fout created from V-3M+n cycles of fin |
| 2M+1 | $V_{2M+1}$ | V-3M+n | V ... V | step 2M+2 in 1st mod. cycle, 2nd cycle of fout created from V cycles of fin |
| 2M+2 | $V_{2M+2}$ | V-3M+n | V ... V | |
| ... | | | | step 2M+2 in 1st mod. cycle, $P^{th}$ cycle of fout created from V cycles of fin |
| 4M-2 | $V_{4M-2}$ | V-3M+n | V ... V | |
| 4M-1 | $V_{4M-1}$ | V-3M+n | V ... V | |
| 0 | $V_0$ | V+M-n | V ... V | step 2 in 2nd mod. cycle, 1st cycle of fout created from V+M-n cycles of fin |
| 1 | $V_1$ | V+M-n | V ... V | step 2 in 2nd mod. cycle, 2nd cycle of fout created from V cycles of fin |
| 2 | $V_2$ | V+M-n | V ... V | |
| ... | | | | step 2 in 2nd mod. cycle, $P^{th}$ cycle of fout created from V cycles of fin |

FIG. 3

Example: $f_{in}$=500MHz cycle=2nS  P=24  V=16  M=8  (step 1 cycle fn per 24 cycles fout)  (mean $f_c$=1.302083.33MHz)

| n | $V_n$ | $V_n$ | $V_{n_{0,2}}$ to $V_{n_{24}}$ | Description |
|---|---|---|---|---|
| 0 | $V_0$ | 24 | 16...16 | 24 cycles fout from 392 cycles fn @ 784nS creates 1st cycle fc=1.27551 MHz |
| 1 | $V_1$ | 23 | 16...16 | 24 cycles fout from 391 cycles fn @ 782nS creates 2nd cycle fc=1.278772 MHz |
| 2 | $V_2$ | 22 | 16...16 | 24 cycles fout from 390 cycles fn @ 780nS creates 3rd cycle fc=1.282051 MHz |
| 3 | $V_3$ | 21 | 16...16 | 24 cycles fout from 389 cycles fn @ 778nS creates 4th cycle fc=1.285347 MHz |
| 4 | $V_4$ | 20 | 16...16 | 24 cycles fout from 388 cycles fn @ 776nS creates 5th cycle fc=1.28866 MHz |
| ... | | | | mean $f_c$ = 1.302083 MHz is achieved in 9th step n=8, resulting in $V_{8_c}$=16 |
| 14 | $V_{14}$ | 10 | 16...16 | 24 cycles fout from 378 cycles fn @ 756nS creates 15th cycle fc=1.322751 MHz |
| 15 | $V_{15}$ | 9 | 16...16 | 24 cycles fout from 377 cycles fn @ 754nS creates 16th cycle fc=1.32626 MHz |
| 16 | $V_{16}$ | 8 | 16...16 | 24 cycles fout from 376 cycles fn @ 752nS creates 17th cycle fc=1.329787 MHz |
| 17 | $V_{17}$ | 9 | 16...16 | 24 cycles fout from 377 cycles fn @ 754nS creates 18th cycle fc=1.32626 MHz |
| 18 | $V_{18}$ | 10 | 16...16 | 24 cycles fout from 378 cycles fn @ 756nS creates 19th cycle fc=1.322751 MHz |
| ... | | | | mean $f_c$ = 1.302083 MHz is achieved in 25th step n=24, resulting in $V_{24_c}$=16 |
| 30 | $V_{30}$ | 22 | 16...16 | 24 cycles fout from 390 cycles fn @ 780nS creates 31st cycle fc=1.282051 MHz |
| 31 | $V_{31}$ | 23 | 16...16 | 24 cycles fout from 391 cycles fn @ 782nS creates 32nd cycle fc=1.278772 MHz |
| 0 | $V_0$ | 24 | 16...16 | 24 cycles fout from 392 cycles fn @ 784nS creates 33rd cycle fc=1.27551 MHz |
| 1 | $V_1$ | 23 | 16...16 | 24 cycles fout from 391 cycles fn @ 782nS creates 34th cycle fc=1.278772 MHz |
| 2 | $V_2$ | 22 | 16...16 | 24 cycles fout from 390 cycles fn @ 780nS creates 35th cycle fc=1.282051 MHz |

FIG. 5

EMI MITIGATION OF POWER CONVERTERS BY MODULATION OF SWITCH CONTROL SIGNALS

TECHNICAL FIELD

The present invention generally relates to mitigation of electromagnetic interference (EMI) caused by switching. More particularly, the invention relates to mitigating EMI generated by power converter switching.

BACKGROUND

Power converters and inverters are used to generate a desired power supply by converting or inverting supplied power. Power converters and inverters are often constructed using analog or mixed signal (digital and analog) components, which introduce control problems due to variations in or distortion of performance of analog components caused by variations in manufacturing, mismatched components and variations in temperature during operation. All of these control problems often necessitate additional control mechanisms, which consume even greater amounts of limited die sizes and available power.

It is common for converters and inverters to employ switches, which must be controlled to generate the desired power supply. Common techniques of controlling switches to generate desired power include controlling the frequency and/or pulse width of a high frequency signal created by a pulse generator. This generally focuses a significant amount of energy at a particular frequency, causing a spike in EMI at the switching frequency.

Thus, a problem introduced by inverters and converters relying on high frequency switching is generation of undesirable EMI, which can interfere with the operation of other components or devices. EMI is also regulated. Thus, for purposes of component and device operation as well as compliance with regulations, EMI must be mitigated.

Common EMI control techniques involve analog or mixed signal circuitry with associated control, die size and power consumption problems. One EMI control technique relies on a mixed signal circuit that generates a randomized analog or digital signal, a microcontroller integrates the random signal into switch control signal, which a DAC converts into a randomized control voltage that, in turn, causes a voltage controlled oscillator (VCO) to produce a randomized switching frequency. The randomized frequencies spread a switch control frequency across a broader range of the frequency spectrum to reduce the EMI intensity at a particular frequency. A second EMI control technique relies on a phase locked loop (PLL) in a mixed signal circuit to spread a control signal across a range of frequency spectrum. A third EMI control technique relies on an analog circuit to generate a SAW wave, which is used to vary the frequency of a switch control signal in accordance with the analog wave. Each of these EMI control techniques involve analog or mixed signal circuitry with associated control, die size and power consumption problems.

An additional problem introduced by randomization of control signals is the random nature of frequency changes in cycles of a switch control signal. The magnitude of difference or displacement in frequency between a first frequency of a first cycle and a second frequency of a second cycle can be significant, which can cause additional problems. Frequency displacement between cycles is often referred to as cycle-to-cycle jitter or phase noise. If displacement exceeds a threshold limit then logic may malfunction.

Therefore, there is a need to improve upon one or more of the numerous problems with mixed signal and analog switch control circuitry and randomization of control signals to mitigate EMI.

SUMMARY

This Summary is provided to introduce concepts in a simplified form. These concepts are described in greater detail below in the section entitled Detailed Description Of Illustrative Embodiments. This Summary is not intended to identify key or essential features of the claimed subject matter, nor limit the scope thereof.

The present invention provides for EMI mitigation in switching circuitry, such as power converters, by implementing a controlled, non-random change in frequency in every cycle of switch control signals. This permits frequency spreading across a wide range while avoiding excessive jitter between cycles and voltage dropouts common to randomized EMI control circuitry. Further, since it may be implemented digitally, some embodiments may avoid performance, size and power consumption problems experienced by mixed signal and analog switch control and EMI control circuitry. By eliminating the need for analog and mixed signal circuitry, as well as additional corrective circuitry, some embodiments of the invention may also reduce design, testing and production costs. Further still, implementations of the present invention may mitigate EMI from a constant frequency source without the necessity of a variable frequency source, such as one generated by a VCO, to realize frequency variation.

A circuit in accordance with an embodiment of the invention may comprise, for example, a switch control signal generator configured to determine a switch control signal based on an input signal and generate an EMI mitigated switch control signal from the input signal or the switch control signal by causing a non-random frequency change in every cycle of the switch control signal. In some embodiments the EMI mitigated switch control signal may be generated directly from the input signal while in others it may be generated from an EMI signal that was generated from the input signal.

A power converter in accordance with an embodiment of the invention may comprise, for example, a power conversion switch controlled by an EMI mitigated switch control signal and a switch control signal generator configured to determine a switch control signal based on an input signal and generate an EMI mitigated switch control signal from the input signal or the switch control signal by causing a non-random frequency change in every cycle of the switch control signal. In some embodiments, the power converter may be a buck or boost converter.

A method in accordance with an embodiment of the invention may comprise, for example, receiving an input signal, determining a switch control signal based on the input signal and generating an EMI mitigated switch control signal from the input signal or switch control signal by causing a non-random frequency change in every cycle of the switch control signal. In some embodiments, the method further comprises determining a modulation cycle to cause the non-random frequency change in every cycle of the switch control signal according to the modulation cycle. Each switch control cycle may be generated from a variable number of input cycles incremented or decremented in accordance with the modulation cycle. In some embodiments, the method further comprises controlling a power converter switch using the EMI mitigated switch control signal.

An input signal may be a constant or variable frequency source. Switch control signal generation and EMI mitigation (e.g. by spreading the signal across a spectrum or range of frequencies) may be implemented entirely in digital logic, whether entirely in digital hardware or a combination of digital hardware, software or firmware.

The non-random frequency change in every cycle of the switch control signal may or may not be a constant or uniform change in frequency. Each cycle of the EMI mitigated switch control signal may be generated from a number of cycles of the input cycle. The number of input cycles used to generate EMI mitigated switch control cycles may vary between consecutive switch control cycles. The variation may be implemented by stepping (incrementing or decrementing) the number of input cycles used to generate each EMI mitigated switch control cycle. The magnitude of change in number of cycles may be constant or variable. Stepping the number of input cycles for each EMI mitigated switch control cycle may be part of a repeated pattern or modulation cycle designed to predictably vary switch control signal frequency over a particular frequency range. In some embodiments, switch control signal generation and EMI mitigation, to generate an EMI mitigated switch control signal, may be programmable to control a modulation cycle, a frequency range, a mean frequency and change in frequency between each cycle of the EMI mitigated switch control signal.

EMI mitigated switch control signal generation may be implemented in multi-stage logic. For example, a first stage may generate consecutive sets of P cycles of an intermediate signal from a non-random, variable number of cycles of the input signal. The first stage may be implemented by a variable divider and a variable divider controller. A second stage may generate each cycle of the EMI mitigated switch control signal from each consecutive set of P cycles of the intermediate signal. The second stage may be implemented by a post divider. In some embodiments, an intermediate signal may comprise a first cycle at a first intermediate frequency generated from a first number of input cycles; and a second cycle at a second intermediate frequency generated from a second number of input cycles. In some embodiments, the second intermediate frequency is common to every set of P cycles while the first intermediate frequency varies in every set of P cycles. In some embodiments, only one cycle in each set of P cycles is generated from a variable number of input cycles while all other cycles in the set of P cycles are generated from the same number of input cycles. Thus, in some embodiments, an input signal may have a constant frequency without intentional change in frequency between input cycles while an intermediate signal may have one or more cycles that intentionally vary in frequency and an EMI mitigated switch control signal may have every consecutive cycle intentionally varying in frequency relative to adjacent cycles.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments of the present invention and, together with the description, further serve to explain the principles involved and to enable a person skilled in the relevant art(s) to make and use the disclosed technologies. However, EMI mitigation by modulation of switch control signals is not limited to the specific implementations disclosed herein. Unless expressly indicated, each figure represents a different embodiment and components in each embodiment are intentionally numbered differently compared to potentially similar components in other embodiments.

FIG. 3 illustrates a table of exemplary operation of variable divider control logic in accordance with an embodiment of the invention.

FIG. 5 illustrates a table of exemplary operation of variable divider control logic for a specific example in accordance with an embodiment of the invention.

DETAILED DESCRIPTION OF ILLUSTRATIVE EMBODIMENTS

Figure 1:
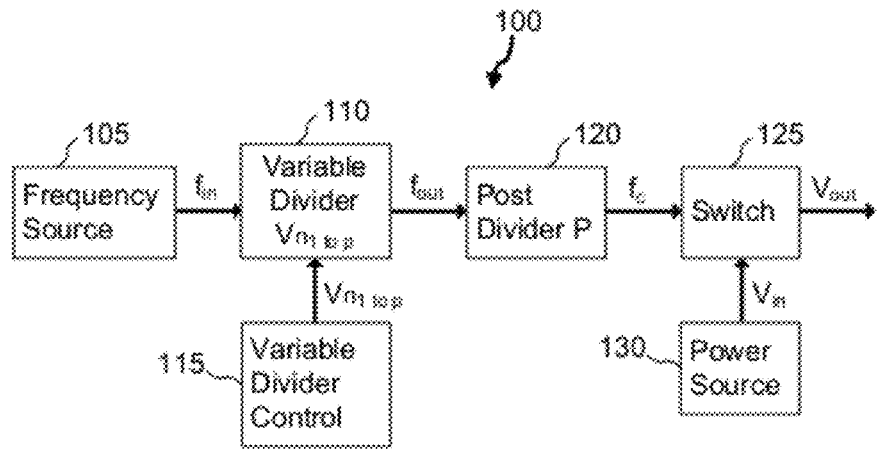
FIG. 1 illustrates a simplified block diagram of a switch control signal generator and a power converter in accordance with an embodiment of the invention.

Reference will now be made to embodiments of the present technology for EMI mitigation by switch control signal modulation, examples of which are illustrated in the accompanying drawings. While the technology for EMI mitigation by switch control signal modulation will be described in conjunction with various embodiments, it will be understood that the embodiments are not intended to limit the present technology. On the contrary, the present technology is intended to cover alternatives, modifications, and equivalents, which may be included within the spirit and scope the various embodiments as defined by the appended claims. In addition, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the embodiments presented.

References in the specification to "embodiment," "example embodiment," or the like, indicate that the embodiment described may include a particular feature, structure, characteristic or step, but every embodiment may not necessarily include the particular feature, structure, characteristic or step. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Unless specifically stated otherwise, terms such as "sampling," "latching," "determining," "selecting," "storing," "registering," "creating," "including," "comparing," "receiving," "providing," "generating," "associating," and "arranging", or the like, refer to the actions and processes of an electronic device that manipulates and transforms data represented as physical (electronic) quantities within the electronic device. The terms "logic," "function," "step," and the like refer to functionality that may be implemented by hardware (digital and/or analog) or a combination of hardware, software and/or firmware. Unless specifically indicated, described and claimed functionality may be implemented by hardware (digital and/or analog) or a combination of hardware, software and/or firmware. The term "programmable" and the like refer to functionality permitting definition or selection of functionality to vary performance of logic from one embodiment to the next, whether one-time or any number of times such as by reprogrammable functionality.

Certain terms are used throughout the following description and claims to refer to particular system components and configurations. As one skilled in the art will appreciate, various skilled artisans and companies may refer to a component by different names. The discussion of embodiments is not intended to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection or though an indirect electrical connection via other devices and connections. Furthermore, the term "information" is intended to refer to any data, instructions, or control sequences that may be communicated between components of a device. For example, if information is sent between two components, data, instructions, control sequences, or any combination thereof may be sent between the two components.

Embodiments of the present invention provide for EMI mitigation in switching circuitry, such as power converters, by implementing a controlled, non-random change in frequency in every cycle of switch control signals based on a static or dynamically changing modulation cycle. This permits frequency spreading across a wide range while avoiding excessive jitter between cycles and voltage dropouts common to randomized EMI control circuitry. Further, since it may be implemented digitally, some embodiments may avoid performance, size and power consumption problems experienced by mixed signal or analog switch control circuitry and EMI control circuitry. Further still, implementations of the present invention may mitigate EMI from a constant frequency source without the necessity of a variable frequency source, such as one generated by a VCO, to realize frequency variation. By eliminating the need for analog and mixed signal circuitry, and additional corrective circuitry, some embodiments may also reduce design, testing and production costs.

Figure 2:
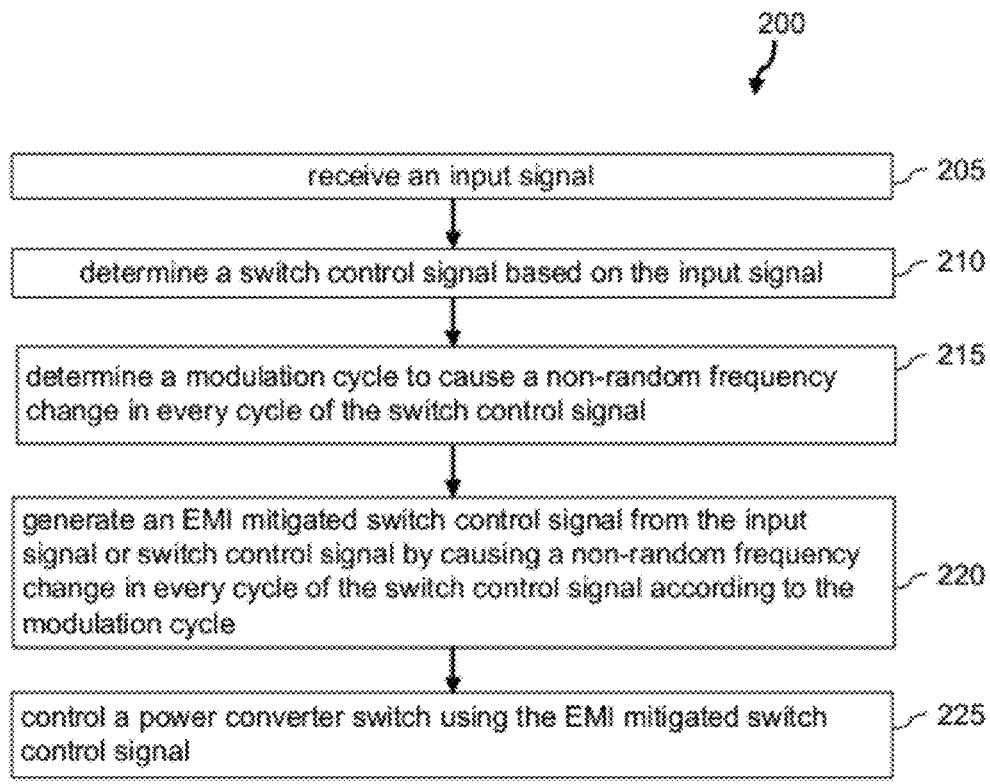
FIG. 2 illustrates a method in accordance with an embodiment of the invention.

For example, FIG. 1 illustrates a simplified block diagram of a switch control signal generator and a power converter in accordance with an embodiment of the invention. Exemplary power converter 100 comprises frequency source 105, variable divider 110, variable divider control 115, post divider 120, power conversion switch 125 and power source 130. Power converter 100 may comprise any power converter or inverter emitting EMI. For example, power converter 100 may comprise a buck or boost type power converter or any other switching power device. It should be understood that the block diagram illustrated in FIG. 2 is intentionally oversimplified to illustrate a logical architecture of one of many possible embodiments. Other embodiments may be configured differently, with more or fewer logical components.

As illustrated in FIG. 1, in some embodiments, EMI mitigated switch control signal generation may be implemented in multi-stage logic. For example, a first stage may generate consecutive sets of P cycles of an intermediate signal $f_{out}$ from a non-random, variable number of cycles of input signal $f_{in}$. The first stage may be implemented, for example, by variable divider 110 and variable divider control 115. A second stage may generate each cycle of the EMI mitigated switch control signal $f_c$ from each consecutive set of P cycles of intermediate signal $f_{out}$. The second stage may be implemented, for example, by post divider 120. It should be understood that switch control signal $f_c$ is not intended to mean that switch control signal $f_c$ directly controls switching in every embodiment. Switch control signal $f_c$ may or may not directly control switching. In some embodiments it may directly control switching while in other embodiments it may indirectly control switching or undergo additional processing before controlling switching directly or indirectly.

Exemplary operation of the embodiment shown in FIG. 1 may be described in view of a method of operation shown in FIG. 2. FIG. 2 illustrates a method 200 in accordance with an embodiment of the invention. Method 200 comprises steps 205-225. It should be understood that steps in each embodiment may vary. Not all steps shown in FIG. 2 are implemented in every embodiment. Some embodiments may implement additional steps. Some embodiments may merge steps shown in FIG. 2. Some embodiments may perform steps shown in FIG. 2, and possibly other steps, out of order shown in FIG. 2. In step 205, an input signal is received, e.g., by variable divider 110, from frequency source 105. Step 205 may be implemented, for example, by cooperation between frequency source 205 and variable divider 110. Frequency source 105 may comprise any frequency source. Frequency source 105 generates and/or provides input signal $f_{in}$ to variable divider 110. Input signal $f_{in}$ may have an input frequency that is constant or variable.

In step 210, a switch control signal prior to EMI mitigation (not shown) based on input signal $f_{in}$ is determined. Step 210 may be implemented, for example, by a power conversion algorithm (not shown). Depending on the embodiment, appropriate switch control may first be determined or may be simultaneously determined and integrated with EMI mitigation. The latter embodiment is depicted in FIG. 1. Thus, in some embodiments, EMI mitigated switch control signal $f_c$ may be generated directly from input signal $f_{in}$ while in other embodiments EMI mitigated switch control signal $f_c$ may be generated from a pre-EMI mitigated switch control signal (not shown). In some embodiments, a power conversion algorithm or other algorithm may determine or determine and generate a pre-EMI mitigation switch control signal based on input signal $f_c$. In some embodiments, a frequency or frequencies of the determined or generated switch control frequency (without EMI mitigation) may be deemed a mean frequency or frequencies around which EMI mitigation efforts are centered to generate an EMI mitigated switch control signal $f_c$. A pre-EMI mitigation switch control signal may have multiple frequencies among its cycles, for example, because a power source may fluctuate or analog components may require temperature compensation. Thus, embodiments of the present invention may be applied to input signals and pre-EMI mitigation switch control signals having static or dynamically changing frequency by making real-time adjustments to control operation and mitigate EMI.

In step 215, a modulation cycle is determined that will cause a non-random frequency change in every cycle of switch control signal $f_c$. Step 215 may be implemented at least in part, for example, by variable divider control 115. In some embodiments, a modulation cycle may be determine by one or more other components (not shown) and stored in a memory portion of variable divider control 115. Variable divider control 115 may store and/or determine variable divisors in real-time. Variable divider control 115 may be programmable. In some embodiments, an objective is to cause a controlled, non-random frequency change (e.g. a small step in frequency) in every cycle of switch control signal $f_c$, or any EMI emitting source that can support EMI mitigation for that matter, in order to spread the signal over a wide spectrum or range of frequencies. Implementing many small frequency changes over a wide range of frequencies avoids high cycle-to-cycle jitter and spreads the energy of a control frequency over a wider range, with lower energy levels at each frequency, to better mitigate EMI. Frequency changes may be implemented in a repetitious modulation cycle or by non-repetitious changes in frequency. A modulation cycle may be a static modulation cycle (e.g. constant and applied repeatedly) or a dynamically changing modulation cycle that may never repeat or may repeat less often than consecutive repetition. Such a dynamically changing modulation cycle may in fact be one long modulation cycle if it can be repeated as a cycle.

Each cycle may comprise a plurality or series of steps or changes in frequency. A non-repetitious cycle may be, for example, an otherwise repetitious cycle that changes a step magnitude for each cycle rather than repeat the same step magnitude in every cycle. In some instances where a pattern of steps ultimately repeats, this may simply be a very long modulation cycle. A non-random change is a change that is not random. It may be predetermined or may be determined in real-time, such as to adapt to dynamic parameters and operating conditions. A step in frequency may be a step of any magnitude and may be positive or negative. It may be based, for example, on a fraction or integer of a cycle or based on time or frequency. A step may be implemented by any operation, e.g., addition, subtraction, multiplication or division. The extent of mitigation, including the EMI mitigation range, is limited only by the ability of specific implementations to function within their operating parameters despite EMI mitigation.

Thus, by operation of EMI mitigation logic such as variable divider 110, variable divider control 115 and post divider 120, each cycle of switch control signal $f_c$ may be generated from a varying number of cycles of input cycle $f_{in}$ to mitigate EMI. The number of input cycles used to generate cycles for EMI mitigated switch control signal $f_c$ may vary between consecutive switch control cycles, thereby spreading the signal across a spectrum or range of frequencies. The variation may be implemented by stepping (e.g. incrementing or decrementing) the number of input cycles used to generate each EMI mitigated switch control cycle. The magnitude of change in number of cycles may be constant or variable. Stepping the number of input cycles for each EMI mitigated switch control cycle may or may not be part of a repeated pattern or modulation cycle designed to predictably vary switch control signal frequency over a particular frequency range. In some embodiments, post divider 120 may be fixed or programmable, variable or constant.

Each of one or more modulation cycle may be fixed or constant, variable and/or programmable. One or more programmed modulation cycles may be selectable and/or programmable to adapt them to particular implementations. In some embodiments, EMI mitigation (e.g. to generate EMI mitigated switch control signal $f_c$) may be programmable to control a modulation cycle, a frequency range, a mean frequency and change in frequency between each cycle of the EMI mitigated switch control signal.

Modulation cycles may vary widely between embodiments as they are dependent upon many variables, including but not limited to input frequency $f_c$, signal control logic components, EMI mitigation logic components carrying out modulation cycles, operational constraints such as tolerances and many other factors that may vary widely between embodiments. In some embodiments, EMI mitigation logic may comprise variable divider 110 and variable divider control 115. In other embodiments, such as the one shown in FIG. 1, switch control signal generator logic may comprise variable divider 110, variable divider control 115, and post divider 120. In the embodiment shown, variable divider 110, variable divider control 115 and post divider 120 are configured to process input signal $f_{in}$ to generate switch control signal $f_c$. In other embodiments, EMI mitigation logic employing EMI mitigation techniques disclosed herein in, on or in conjunction with a device, circuit, component or signal may comprise one or more logical components. Precisely where and how EMI mitigation techniques described herein are implemented may vary widely among many embodiments. Thus, since EMI mitigation techniques described herein may be applied to a wide variety of EMI sources, which need not emanate from a switch or switch control signals, there will also be a wide variety of modulation cycles within the scope of the present invention.

In step 220, an EMI mitigated switch control signal $f_c$ is generated from the input signal $f_{in}$ or pre-EMI mitigation switch control signal (not shown) by causing a non-random frequency change in every cycle of the switch control signal $f_c$ according to the modulation cycle determined in step 215. Each switch control cycle $f_c$ may be generated from a variable number of input cycles $f_{in}$ incremented or decremented in accordance with the modulation cycle. Step 220 may be implemented, at least in this embodiment, by variable divider 110, variable divider 115 and post divider 120. As shown, variable divider 110 receives input signal $f_{in}$, divides input signal $f_{in}$ by variable divisor $Vn_{1\ to\ P}$, which is generated by variable divider control 115, and generates intermediate signal $f_{out}$. In this embodiment, variable divisor $Vn_{1\ to\ P}$ may be generated according to a modulation cycle determined in step 215. Vn indicates there may be one or more (i.e. n) steps in a modulation cycle while 1 to P indicates that, for each step n in the modulation cycle, P cycles of intermediate signal $f_{out}$ may be generated from input signal $f_{in}$. Thus, in some embodiments, varying numbers of cycles of input signal $f_{in}$ may be used to generate each cycle of intermediate signal $f_{out}$. Post divider 120 receives intermediate signal $f_{out}$ and divides it by divisor P to generate switch control signal $f_c$. P may be constant or variable. Thus, every P cycles of intermediate signal $f_{out}$ may be used to generate one cycle of switch control signal $f_c$. Some embodiments may not implement post divider 120 or may integrate divisor P within variable divider 110. Thus, in some embodiments, EMI mitigated switch control signal $f_c$ may be generated directly from input signal $f_{in}$.

Switch control signal generation and EMI mitigation, implemented in this embodiment by variable divider 110, variable divider control 115 and post divider 120, may be implemented entirely in digital logic, whether entirely in digital hardware or a combination of digital hardware, software or firmware. Software and firmware may be stored in memory, for example, as executable instructions that implement logic when executed by a processor. As well, information may be stored in memory for access by a processor executing the instructions to implement logic of functionality described with reference to FIGS. 1-7. Implementation in digital logic may provide several advantages over conventional EMI mitigation techniques.

In step 225, a power converter switch 125 is controlled using EMI mitigated switch control signal $f_c$. Step 225 may be implemented, for example, by providing EMI mitigated switch control signal $f_c$ and a power source having input voltage $V_{in}$ to power conversion switch 125. In the embodiment shown in FIG. 1, power source 130 provides power having input voltage $V_{in}$ to power conversion switch 125. Operation of switch 125, controlled by EMI mitigated switch control signal $f_c$, generates output power having output voltage $V_{out}$ from input power having input voltage $V_{in}$. Power conversion switch 125 may comprise any power conversion switch including, but not limited to a metal oxide semiconductor (MOS) switch. Power source 130 may comprise any power source.

Having generally described operation of EMI mitigation techniques, several detailed examples will be discussed with reference to FIGS. 3-7. As illustrated in FIGS. 3-7, in some embodiments, intermediate signal $f_{out}$ may comprise a first cycle at a first intermediate frequency generated from a first number of input cycles; and a second cycle at a second intermediate frequency generated from a second number of input cycles. In some embodiments, the second intermediate frequency may be common to every set of P cycles while the first intermediate frequency varies in every set of P cycles. In some embodiments, only one cycle in each set of P cycles is generated from a variable number of input cycles while all other cycles in the set of P cycles are generated from the same number of input cycles. Thus, in some embodiments, input signal $f_c$ may have a constant frequency without intentional change in frequency between input cycles while intermediate signal $f_{out}$ may have one or more cycles that intentionally vary in frequency and EMI mitigated switch control signal $f_c$ may have every consecutive cycle intentionally varying in frequency relative to adjacent cycles.

FIG. 3 illustrates a table 300 of exemplary operation of variable divider control logic in accordance with an embodiment of the invention. Variable divider control table 300 is based on the embodiment shown in FIG. 1. As previously indicated, in the embodiment illustrated in FIG. 1, EMI mitigation logic comprises variable divider 110, variable divider control 115 and post divider 120. As indicated in table 300, variable divider control 115 provides divisors $Vn_1$ to $Vn_p$ to variable divider 110 for each step n in the modulation cycle. For each step n in the modulation cycle, variable divider 110 uses divisors $Vn_1$ to $Vn_p$ to divide input signal $f_{in}$ P times. As a result, variable divider 110 generates n sets of P cycles of intermediate signal $f_{out}$, one set for each step n of the modulation cycle. Stated another way, variable divider 110 converts consecutive sets of cycles of input signal $f_{in}$ to n sets of P cycles of intermediate signal $f_{out}$. Then post divider 120 divides intermediate signal $f_{out}$ by P or, stated another way, post divider 120 converts each consecutive set of P cycles of intermediate signal $f_{out}$ to consecutive cycles of switch control signal $f_c$, one cycle per set of P cycles of intermediate signal $f_{out}$.

In this embodiment, EMI mitigation parameters are programmable. An exemplary programmable EMI mitigation algorithm for an exemplary modulation cycle operated by variable divider control 115 that determines variable divisor $Vn_{1\ to\ P}$, accounting for post divisor P, may be described as follows by Equations 1-8:

$$Vn_1 = V+M-n \text{ for } 0 \le n \le 2M-1 \quad \text{Equation 1}$$

$$Vn_1 = V-3M+n \text{ for } 2M \le n \le 4M-1 \quad \text{Equation 2}$$

$$Vn_{2\ to\ P} = V \quad \text{Equation 3}$$

$$f_{mean} = f_{in} \div VP \quad \text{Equation 4}$$

$$f_{min} = f_{in} \div ((V+M)+V(P-1)) \quad \text{Equation 5}$$

$$f_{max} = f_{in} \div ((V-M)+V(P-1)) \quad \text{Equation 6}$$

$$\Delta f_c = f_{in} \div (VP+M-n) - f_{in} \div (VP+M-n-1) \text{ for } 0 \le n \le 2M-1 \quad \text{Equation 7}$$

$$\Delta f_c = f_{in} \div (VP-3M+n) - f_{in} \div (VP-3M+n+1) \text{ for } 2M \le n \le 4M-1 \quad \text{Equation 8}$$

where Vn is a variable division step n in the modulation cycle, $Vn_{1\ to\ P}$ is a set of divisors generated by variable divider control 115 and applied by variable divider 110, n is the number of steps in the modulation cycle, $Vn_1$ is the variable divisor applied to generate the first cycle of intermediate signal $f_{out}$ in each step n in the modulation cycle, $Vn_{2\ to\ p}$ are the variable (or fixed) divisors applied to generate the second through P cycles of intermediate signal $f_{out}$ in each step n, P is divisor P applied by post divider 120, V is a base divisor, M is the maximum change applied to base divisor V and the modulation cycle is selected to step by one cycle of input signal $f_{in}$ per step n of the modulation cycle over 4M steps. In this embodiment, n is the number of steps in the modulation cycle that begins at zero and increments by 1 up to 4M−1 then resets to zero and repeats. Mean frequency $f_{mean}$ is the mean or average frequency of EMI mitigated switch control signal $f_c$. Maximum frequency $f_{max}$ is the maximum frequency of EMI mitigated switch control signal $f_c$ during the modulation cycle. Minimum frequency $f_{min}$ is the minimum frequency of EMI mitigated switch control signal $f_c$ during the modulation cycle. Change in EMI mitigated switch control signal $f_c$, i.e., $\Delta f_c$, is the change in frequency between cycle n and the subsequent cycle of EMI mitigated switch control signal $f_c$. It should be understood that different modulation cycles or EMI mitigation may be defined by a different set of equations.

In this embodiment, equations 1-3 indicate that only one cycle of intermediate signal $f_{out}$ varies in frequency per step n of the modulation cycle. In each step n of the modulation cycle, all cycles of intermediate signal $f_{out}$ have the same frequency determined by divisor V, i.e., Equation 3 ($Vn_{2\ to\ P}=V$), applied to input signal $f_{in}$ except one cycle determined by a variable divisor, i.e., $Vn_1$, per Equations 1 and 2. As indicated by Equations 1 and 2, the first cycle in each set of P cycles of intermediate signal $f_{out}$ varies from a previous first cycle in a previous set of P cycles by 1 cycle of input signal $f_{in}$, since n increments by 1 in this embodiment.

As shown in table 300, modulation cycle step n increments by 1 between zero and 4M−1 before resetting and repeating. Thus, in this embodiment, the modulation cycle has 4M steps. Accordingly, there are 4M variable division steps Vn in the modulation cycle. The first divisor $Vn_1$ in each division step Vn steps (increments or decrements) by one relative to the first divisor $Vn-1_1$ in an immediately preceding division step Vn−1. Second through P divisors $Vn_{2\ to\ P}$ are the same in each division step Vn of the modulation cycle. As indicated in the description of table 300, in the fifth step n=4 of a first modulation cycle, a first cycle of intermediate signal $f_{out}$ is generated from V+M−n cycles of input signal $f_{in}$ because the first divisor $V_{4_1}$ in the fifth division step $V_4$ is V+M−n. In the fifth step n=4 of a first modulation cycle, the second through P cycles of intermediate signal $f_{out}$ are generated from V cycles of input signal $f_{in}$ because each of the second through P divisors $V_{4_{2\ to\ P}}$ in the fifth division step $V_4$ are V. In step n=2M+2 of a first modulation cycle, a first cycle of intermediate signal $f_{out}$ is generated from V−3M+n cycles of input signal $f_{in}$ because the first divisor $V_{2m+2_1}$ in the 2M+2 division step $V_{2M+2}$ is V−3M+n. In step n=2M+2 of a first modulation cycle, the second through P cycles of intermediate signal $f_{out}$ are generated from V cycles of input signal $f_{in}$ because each of the second through P divisors $V_{2m+2_{2\ to\ P}}$ in the 2M+2 division step $V_{2M+2}$ are V. In the third step n=2 of a second modulation cycle, a first cycle of intermediate signal $f_{out}$ is generated from V+M−n cycles of input signal $f_{in}$ because the first divisor $V_{2_1}$ in the third division step $V_2$ is V+M−n. In the third step n=2 of the second modulation cycle, the second through P cycles of intermediate signal $f_{out}$ are generated from V cycles of input signal $f_{in}$ because each of the second through P divisors $V_{2_{to\,P}}$ in the third division step $V_2$ are V.

Figure 4:
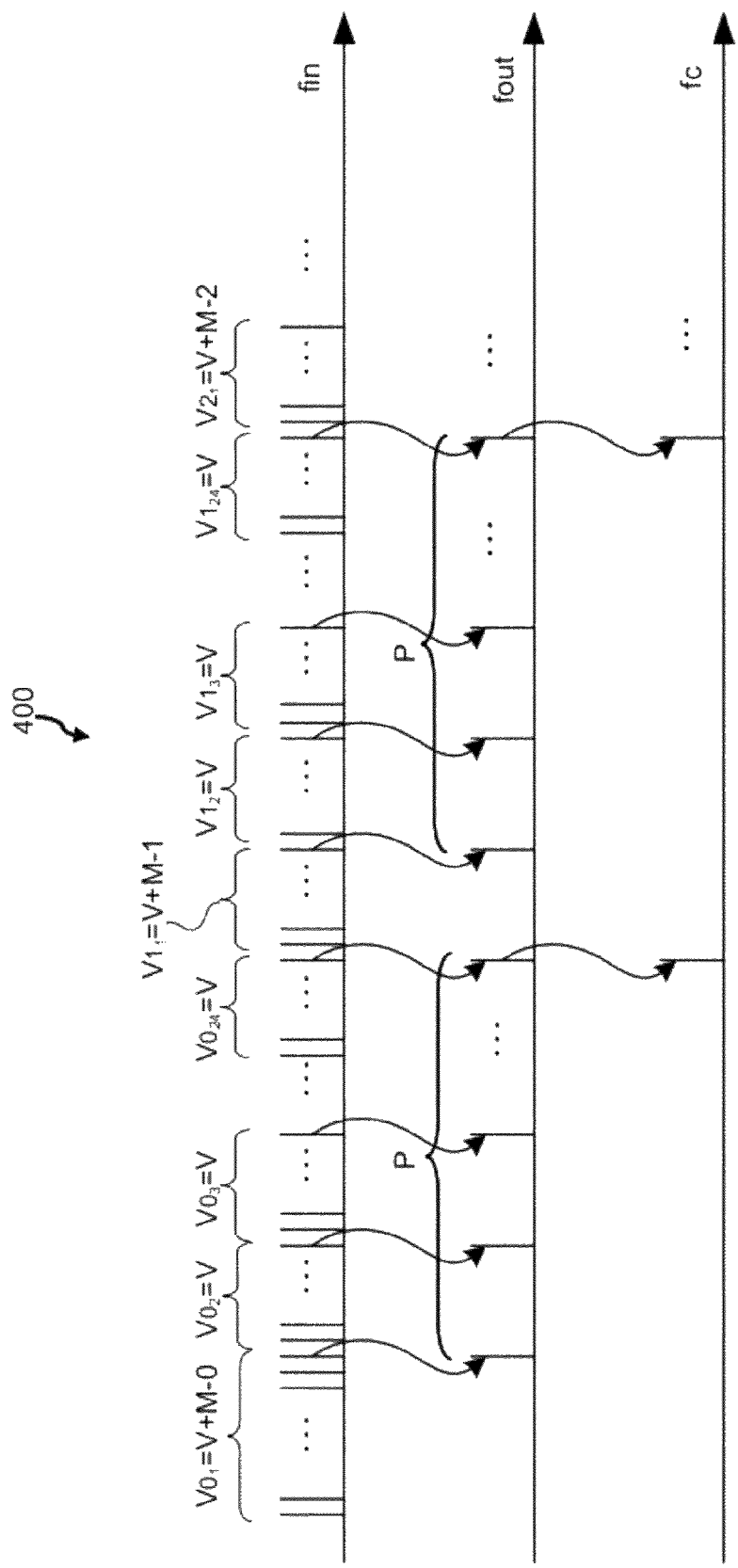
FIG. 4 illustrates a simplified timing diagram for the exemplary operation of variable divider control logic in FIG. 3.

FIG. 4 illustrates a simplified timing diagram 400 for the exemplary operation of variable divider control logic shown in table 300 in FIG. 3. It should be understood that FIG. 4 is intentionally oversimplified to graphically indicate only the end of cycles of each of input, intermediate and switch control signals $f_{in}$, $f_{out}$ and $f_c$ in order to relate the basic operation of modulation cycle table 300 in FIG. 3. It can be observed in FIG. 4 that input signal $f_{in}$ has a constant frequency in this example, that each step n of the modulation cycle results in P cycles of intermediate signal $f_{out}$ and that only one cycle of switch control signal $f_c$ results from every P cycles of intermediate signal $f_{out}$. It can also be observed in FIG. 4 that only the first variable divisor of each step in the modulation cycle, e.g., first variable divisor in each of first three steps $V_{0_1}$, $V_{1_1}$ and $v_{2_1}$, varies respectively as V+M+0, V+M+1 and V+M+2 as modulation cycle step n increments from 0 to 1 to 2. All other divisors are V, e.g., second, third and $24^{th}$ variable divisors in each of the first two steps $V_{0_2}$, $V_{0_3}$, $V_{0_{24}}$, $V_{1_2}$, $V_{1_3}$ and $V_{1_{24}}$.

FIG. 5 illustrates a table 500 of exemplary operation of variable divider control logic for a specific example in accordance with an embodiment of the invention. Variable divider control table 500 presents a specific example of the modulation cycle and other details of variable divider control logic illustrated in table 300. In this specific example, input signal $f_{in}$ is a constant or fixed frequency of 500 MHz, ignoring any unintentional variation. At 500 Megahertz (MHz), one cycle (or period) of input signal $f_{in}$ is 2 nanoseconds (nS). In addition, divisor P is 24, variable base divisor V is 16, maximum variation M is 8 and each step of the modulation cycle steps one cycle of input signal $f_{in}$. As shown in table 500, modulation cycle step n increments by 1 between zero and 4M−1 or 31 before resetting to zero and repeating. Accordingly, there are 32 variable division steps Vn in the modulation cycle. Each step generates 24 cycles of intermediate signal $f_{out}$. Each set of 24 cycles of intermediate signal $f_{out}$ comprises 23 cycles generated from V=16 cycles of input signal $f_{in}$. Only one cycle in each set of 24 cycles varies in increments of one between eight and 24 cycles of input signal $f_{in}$. The total number of cycles of input signal $f_{in}$ used to generate each cycle of EMI mitigated switch control signal $f_c$ varies from a maximum of 392 cycles to a minimum of 376 cycles, resulting in switch control frequency $f_c$ having a mean frequency $f_{mean}$ equal to 1.302083.33 MHz, a minimum frequency $f_{min}$ equal to 1.27551 MHz and a maximum frequency $f_{max}$ equal to 1.329787 MHz according to Equations 4, 5 and 6.

As shown in table 500, the first divisor $Vn_1$ in each division step Vn steps (increments or decrements) by one starting at 24, decreasing to eight then increasing back to 24 over 32 steps in the modulation cycle and repeating in subsequent modulation cycles. This is described by Equations 1 and 2. Second through $24^{th}$ divisors $Vn_{2\,to\,24}$ are the same divisor 16 in each division step Vn of the modulation cycle. This is described by Equation 3. The result of varying only the first divisor by one cycle of input signal $f_{in}$ for each of 32 steps of the modulation cycle are presented under the description column of table 500. It can be seen that each cycle of switch control signal $f_c$ is generated from a changing number of cycles of input signal $f_{in}$. The first cycle of switch control signal $f_c$ is generated from 392 cycles of input signal $f_{in}$. This results in a frequency of 1.27551 MHz, which can be determined by dividing input signal $f_{in}$ frequency of 500 MHz by 392. The frequency of 1.27551 MHz for the first cycle of switch control signal $f_c$ is the minimum frequency $f_{min}$ because 392 is the maximum cumulative divisor in the steps of the modulation cycle. The second cycle of switch control signal $f_c$ is generated from 391 cycles of input signal $f_{in}$. This results in a frequency of 1.278772 MHz, which can be determined by dividing input signal $f_{in}$ frequency of 500 MHz by 391. The third cycle of switch control signal $f_c$ is generated from 390 cycles of input signal $f_{in}$. This results in a frequency of 1.285347 MHz, which can be determined by dividing input signal $f_{in}$ frequency of 500 MHz by 390.

As predicted by Equation 7, the change in frequency between the first to second cycles and between the second to third cycles is, respectively, 3262 Hz and 3279 Hz. In this exemplary modulation cycle, the frequency change between cycles is not constant or uniform. In other embodiments, the frequency change between cycles may be constant. The mean frequency $f_{mean}$ of 1.302083 MHz is achieved in the ninth and $25^{th}$ cycles of switch control frequency $f_{in}$ when n is eight and 24 and the first variable divisor in the ninth and $25^{th}$ steps $V_{8_1}$ and $V_{24_1}$ are each 16. In some embodiments, mean frequency $f_{mean}$ may be considered a pre-EMI mitigated control signal around which EMI mitigation is centered, which is determined in step 210 in FIG. 2. In this exemplary modulation cycle, each variable divisor Vn, except for $V_{16}$ for the $17^{th}$ cycle generating maximum frequency $f_{max}$, is repeated twice and each switch control frequency $f_c$ is repeated twice. In other embodiments, there may be more repetition or no repetition within a modulation cycle. Also, in other embodiments a modulation cycle may not be repeated at all or may repeat less often, e.g., in embodiments where there are a plurality of modulation cycles. For example, a plurality of modulation cycles may be generated by modifying one or more parameters in another modulation cycle, resulting in a different set of frequencies for switch control signal $f_c$ relative to the other modulation cycle.

Following the first three steps of the first modulation cycle, table 500 continues by presenting selected steps 4, 5, 15-19, 31 and 32 during the first modulation cycle and steps 1-3 during the second modulation cycle. It can be seen in this example of a repetitive modulation cycle that the first three steps of the second modulation cycle repeat the first three steps of the first modulation cycle. Each step in a modulation cycle represents one cycle of switch control signal $f_c$. A reminder that n lags the step number or cycle of switch control signal $f_c$ by one because it starts at zero. In other words, the cycles of switch control signal $f_c$ are numbered one through 32 while modulation cycle steps n are numbered zero through 31. Cycles of switch control signals $f_c$ are numbered consecutively, such that the $33^{rd}$ cycle of switch control signal $f_c$ is a first step of a second modulation cycle where n has reset to zero. By now the specific example of a modulation cycle in table 500 should be self-explanatory in causing a non-random frequency change in every cycle of switch control signal $f_c$ by generating each cycle of switch control signal $f_c$ from a different number of cycles of input signal $f_{in}$. In this example, the number of cycles changes by a constant or uniform amount between cycles while in other embodiments the change in cycles may not be constant. In this example, the frequency change in every cycle is not a constant or uniform change in frequency while in other embodiments it may be. The range of cycles is 18, i.e., maximum of 392 cycles minus minimum of 374 cycles, and the range of frequency is 1.329787 MHz to 1.27551 MHz. It can be seen that selection of one or more modulation cycle parameters input signal frequency, divisor P, variable base divider V, maximum variation M and changing one cycle per step in the modulation cycle are able to control the modulation cycle, a frequency range, a mean frequency and change in frequency between each cycle of the EMI mitigated switch control signal $f_c$.

Figure 6:
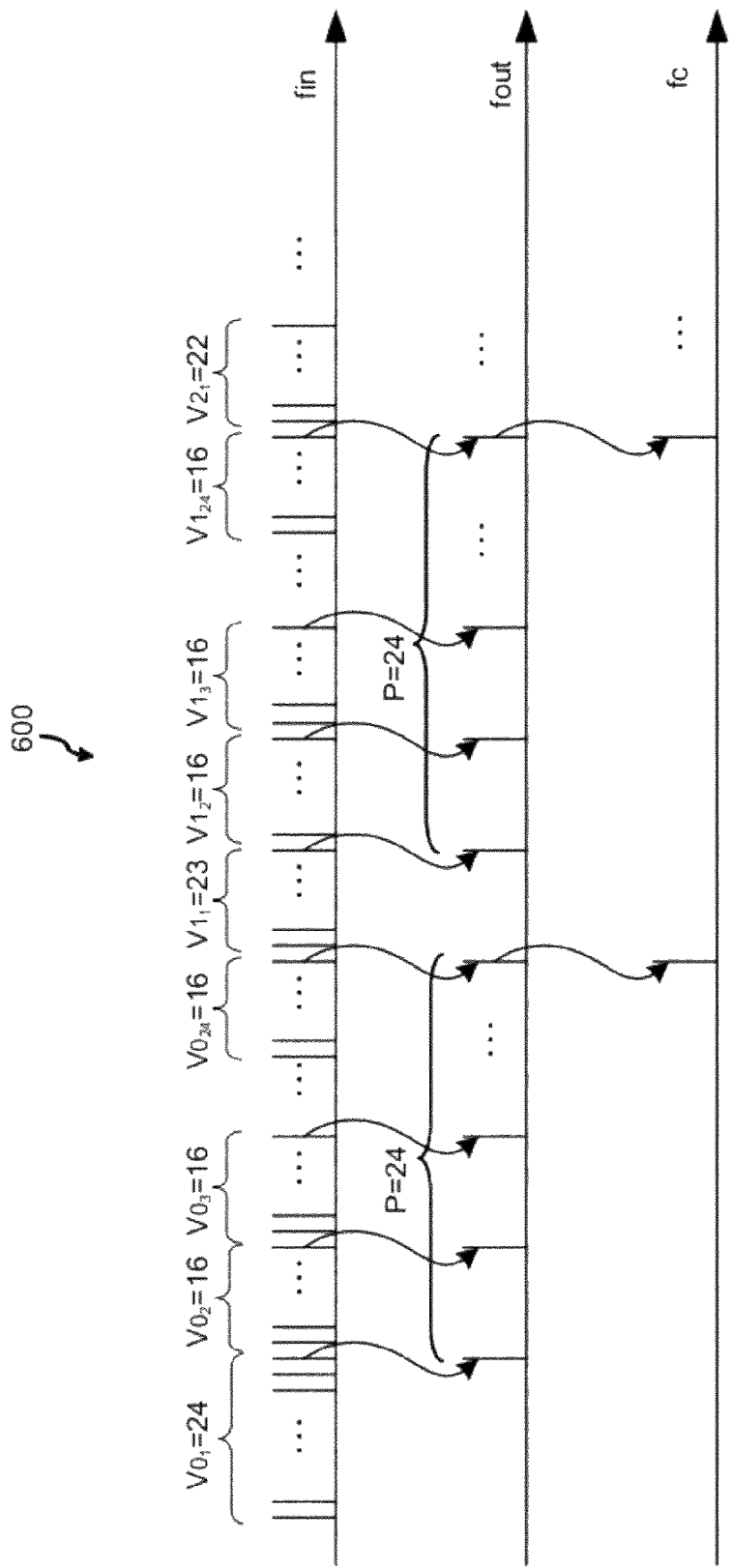
FIG. 6 illustrates a simplified timing diagram for the exemplary operation of variable divider control logic in accordance with the specific example in FIG. 5.

FIG. 6 illustrates a simplified timing diagram 600 for the exemplary operation of variable divider control logic shown in table 500 in accordance with the specific example in FIG. 5. It should be understood that FIG. 6 is intentionally oversimplified to graphically indicate only the end of cycles of each of input, intermediate and switch control signals $f_{in}$, $f_{out}$ and $f_c$ in order to relate the basic operation of modulation cycle table 500 in FIG. 5. In accordance with the exemplary modulation cycle in FIG. 5, input signal $f_{in}$ has a constant frequency of 500 MHz in this example. Each step n of the 32 steps of the modulation cycle results in 24 cycles of intermediate signal $f_{out}$. Only one cycle of switch control signal $f_c$ results from every 24 cycles of intermediate signal $f_{out}$. It can also be observed in FIG. 6 that only the first variable divisor of each step in the modulation cycle, e.g., first variable divisor in each of first three steps $V_{0_1}$, $V_{1_1}$ and $v_{2_1}$, varies respectively as 24, 23 and 22 as modulation cycle step n increments from 0 to 1 to 2. All other divisors are 16, e.g., second, third and $24^{th}$ variable divisors in each of the first two steps $V_{0_2}$, $V_{0_3}$, $V_{0_{24}}$, $V_{1_2}$, $V_{1_3}$ and $V_{1_{24}}$.

Figure 7:
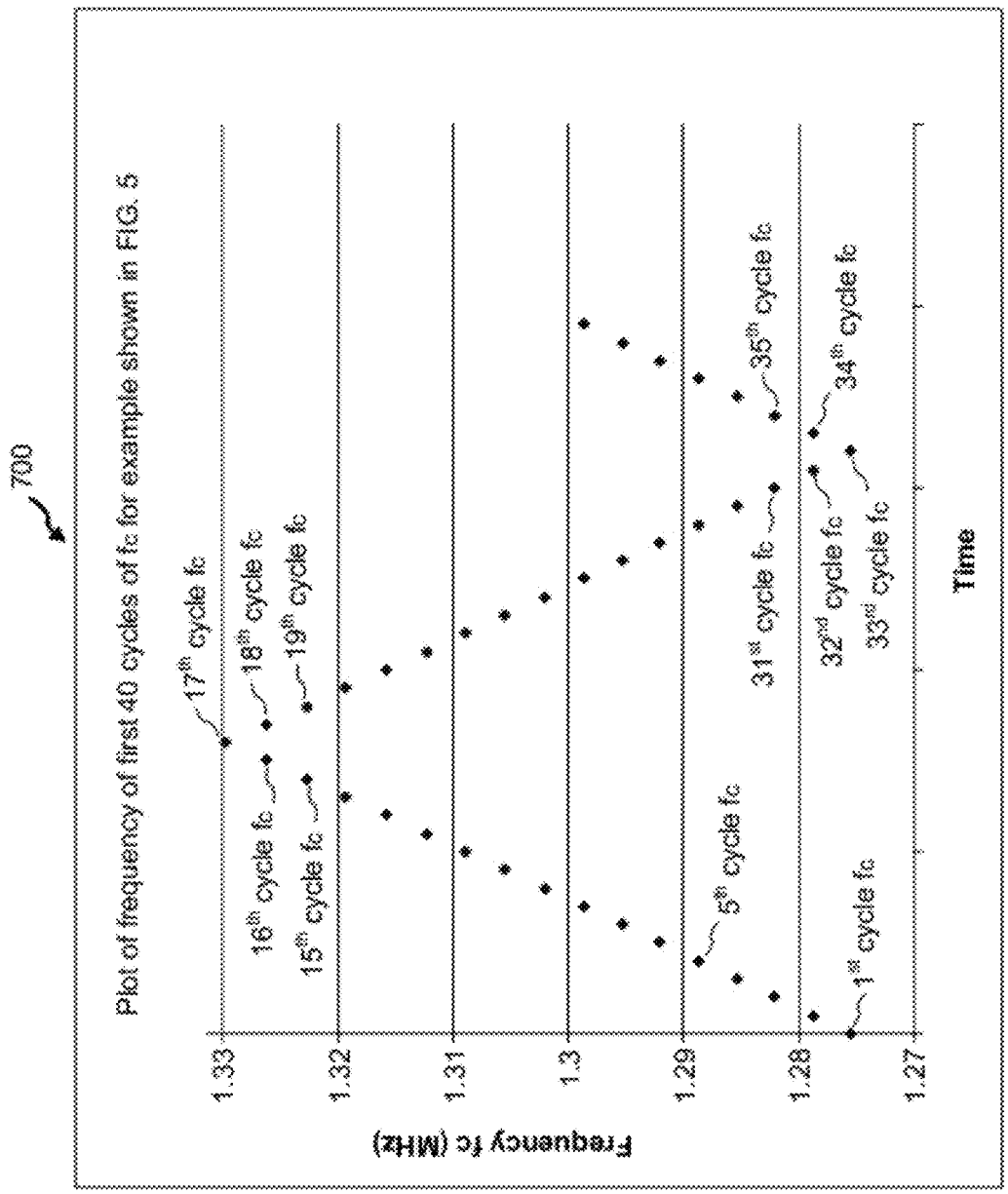
FIG. 7 illustrates a simplified plot of frequency changing over time for cycles of an EMI mitigated switch control signal in accordance with the specific example in FIG. 5.

FIG. 7 illustrates a simplified frequency plot 700 of frequency changing over time for cycles of an EMI mitigated switch control signal $f_c$ in accordance with the specific example in FIG. 5. Frequency plot 700 shows only the first 40 cycles of EMI mitigated switch control signal $f_c$. It should be understood that in this example the plot is repetitive and continues on in a similar pattern beyond the first 40 cycles so long as the repetitive modulation cycle is applied to input signal $f_{in}$ and so long as input signal $f_{in}$ remains at 500 MHz. Select cycle frequencies are identified to indicate time progresses to the right of plot 700 and to indicate the beginning and end of modulation cycles. The first modulation cycle is indicated by the first through $32^{nd}$ cycles while the second modulation cycle is indicated starting with the $33^{rd}$ cycle.

The inventions described herein may provide numerous benefits. For example, a controlled, non-random change in frequency in every cycle of switch control signals and other signals as well permits frequency spreading across a wide range while avoiding excessive jitter between cycles and voltage dropouts common to randomized EMI control circuitry. Further, since it may be implemented digitally, some embodiments may avoid performance, size and power consumption problems experienced by mixed signal and analog switch control circuitry and EMI control circuitry. Further still, implementations of the present invention may mitigate EMI from a constant frequency source without the necessity of a variable frequency source, such as one generated by a VCO, to realize frequency variation. By eliminating the need for analog and mixed signal circuitry, as well as additional corrective circuitry, some embodiments of the invention may also reduce design, testing and production costs.

It should be understood that EMI mitigation techniques described herein apply beyond switching devices and switching power converters to any EMI emitting device, circuit, component or signal. EMI mitigation techniques described herein may be implemented in, on or in conjunction with any EMI emitting device, circuit, component or signal. Implementation may be as extensive or limited as technically feasible for desired operation of particular devices, circuits, components or signals having various operating tolerances and frequency ranges of EMI mitigation. Techniques described herein may be implemented in hardware (digital and/or analog) or a combination of hardware, software and/or firmware. Techniques described herein may be implemented in one or more components. For example, some or all aspects of an embodiment may be implemented in a processor, such as a universal processor or digital signal processor, microcontroller, frequency divider, switch control generator, etc.

Embodiments of the invention are directed to computer program products comprising logic (e.g., in the form of program code or software as well as firmware) stored on any computer useable medium, which may be integrated in or separate from other components such as processors. Such program code, when executed in one or more processors, causes a device to operate as described herein. Devices in which embodiments may be implemented may include storage, such as storage drives, memory devices, and further types of computer-readable media. Examples of such computer-readable media include, but are not limited to, a hard disk, a removable magnetic disk, a removable optical disk, flash memory cards, digital video disks, random access memories (RAMs), read only memories (ROM), and the like. In greater detail, examples of such computer-readable media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may, for example, store computer program logic, e.g., program modules, comprising computer executable instructions that, when executed, provide and/or maintain one or more aspects of functionality described herein with reference to FIGS. 1-7, as well as any and all components, steps and functions therein and/or further embodiments of the present invention described herein.

While the present invention has been described with respect to a limited number of embodiments, those skilled in the art will appreciate numerous modifications and variations there from. Embodiments have been presented by way of example only, and not limitation. It will be apparent to persons skilled in the relevant art(s) that various changes in form and details can be made therein without departing from the spirit and scope of the invention. It is intended that the appended claims cover all such modifications and variations as fall within the true spirit and scope of this present invention.

Proper interpretation of subject matter described herein and claimed hereunder is limited to patentable subject matter under 35 U.S.C. §101. Subject matter described in and claimed based on this patent application is not intended to and does not encompass unpatentable subject matter. As described herein and claimed hereunder, a method is a process defined by 35 U.S.C. §101. As described herein and claimed hereunder, each of a circuit, device, converter, apparatus, machine, system, computer, module, media and the like is a machine or manufacture defined by 35 U.S.C. §101.

What is claimed:

1. A circuit comprising:
   a switch control signal generator configured to:
      generate each cycle in a plurality of cycles of an electromagnetic interference (EMI) mitigated switch control signal from at least two cycles of an input signal so that each cycle in the plurality of cycles of the EMI mitigated switch control signal has a non-random frequency change relative to a frequency of an immediately mitigated switch control signal; and
   a configuration providing the EMI mitigated switch control signal to a switching device causing the switching device to switch with the non-random frequency change each time the switching device switches in response to the EMI mitigated switch control signal.

2. The circuit of claim 1, wherein the non-random frequency change is a variable, non-constant change in frequency.

3. The circuit of claim 1, each cycle of the EMI mitigated switch control signal being generated from a number of cycles of the input signal, wherein the number of cycles changes, incrementing or decrementing, by a non-random magnitude between each consecutive cycle of the EMI mitigated switch control signal.

4. The circuit of claim 3, wherein the non-random magnitude of change in number of cycles is a constant change in magnitude.

5. The circuit of claim 3, wherein the non-random magnitude of change in number of cycles comprises a repetitive modulation cycle within a frequency range or range of cycles of the input signal.

6. The circuit of claim 5, wherein the circuit is programmable to control a modulation cycle, a frequency range, a mean frequency and change in frequency between each cycle of the EMI mitigated switch control signal.

7. The circuit of claim 1, wherein the switch control signal generator comprises:
a first stage configured to generate consecutive sets of P cycles of an intermediate signal from a non-random variable number of cycles of the input signal; and
a second stage configured to generate each cycle of the EMI mitigated switch control signal from each consecutive set of P cycles of the intermediate signal.

8. The circuit of claim 7, wherein only one cycle in each set of P cycles of the intermediate signal is generated from a variable number of cycles of the input signal while all other cycles in the set of P cycles are generated from the same number of cycles of the input signal.

9. The circuit of claim 8, wherein there is no intentional change in frequency between cycles of the input signal, wherein a frequency of only one cycle in each set of P cycles of the intermediate signal intentionally varies and wherein a frequency of every cycle of the EMI mitigated switch control signal intentionally varies.

10. The circuit of claim 1, wherein the circuit is implemented entirely in digital logic, whether entirely in digital hardware or a combination of digital hardware, software or firmware.

11. A power converter comprising
a switch control signal generator configured to:
generate each cycle in a plurality of cycles of an electromagnetic interference (EMI) mitigated switch control signal from at least two cycles of an input signal so that each cycle in the plurality of cycles of the EMI mitigated switch control signal has a non-random frequency change relative to a frequency of an immediately mitigated switch control signal; and
a power conversion switch controlled by the EMI mitigated switch control signal causing the power conversion switch to switch with the non-random frequency change each time the power conversion switch switches in response to the EMI mitigated switch control signal.

12. The circuit of claim 11, wherein the power converter comprises a buck or boost converter.

13. The circuit of claim 11, wherein the switch control signal generator comprises:
a first stage configured to generate consecutive sets of P cycles of an intermediate signal from a non-random variable number of cycles of the input signal; and
a second stage configured to generate each cycle of the EMI mitigated switch control signal from each consecutive set of P cycles of the intermediate signal.

14. The circuit of claim 13, wherein each set of P cycles of the intermediate signal comprises:
a first cycle at a first intermediate frequency generated from a first number of input cycles; and
a second cycle at a second intermediate frequency generated from a second number of input cycles.

15. The circuit of claim 14, wherein the second intermediate frequency is common to every set of P cycles while the first intermediate frequency varies in every set of P cycles.

16. A method comprising:
receiving an input signal;
generating each cycle in a plurality of cycles of an electromagnetic interference (EMI) mitigated switch control signal from at least two cycles of the input signal so that each cycle in the plurality of cycles of the EMI mitigated switch control signal has a non-random frequency change relative to a frequency of an immediately preceding cycle of the EMI mitigated switch control signal; and
providing the EMI mitigated switch control signal to a switching device causing the switching device to switch with the non-random frequency change each time the switching device switches in response to the EMI mitigated switch control signal.

17. The method of claim 16, further comprising determining a modulation cycle to cause the non-random frequency change according to the modulation cycle.

18. The method of claim 17, each cycle of the EMI mitigated switch control signal being generated from a number of cycles of the input cycle, wherein the non-random frequency change in every cycle of the EMI mitigated switch control signal is provided by:
incrementing or decrementing a number of cycles of the input signal in accordance with the modulation cycle; and
generating a cycle of the EMI mitigated switch control signal from the incremented or decremented number of cycles of the input signal.

19. The method of claim 16, wherein the non-random frequency change is provided by:
generating consecutive sets of P cycles of an intermediate signal from a non-random variable number of cycles of the input signal; and
generating each cycle of the EMI mitigated switch control signal from each consecutive set of P cycles of the intermediate signal.

20. The method of claim 16, the switching device comprising a power converter switch, further comprising:
controlling the power converter switch using the EMI mitigated switch control signal.

* * * * *